United States Patent
Driesen et al.

(10) Patent No.: US 8,301,610 B2
(45) Date of Patent: Oct. 30, 2012

(54) OPTIMIZING SEARCH FOR INSERT-ONLY DATABASES AND WRITE-ONCE DATA STORAGE

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 173 days.

(21) Appl. No.: 12/840,719

(22) Filed: Jul. 21, 2010

(65) Prior Publication Data

US 2012/0023125 A1 Jan. 26, 2012

(51) Int. Cl.
*G06F 17/30* (2006.01)
(52) U.S. Cl. .......... 707/705; 707/706; 707/769
(58) Field of Classification Search .......... 707/705, 707/706, 769
See application file for complete search history.

(56) References Cited

U.S. PATENT DOCUMENTS

| | | | |
|---|---|---|---|
| 7,346,628 B2* | 3/2008 | Porter | 1/1 |
| 7,664,790 B2* | 2/2010 | Blaicher et al. | 707/999.202 |
| 8,055,609 B2* | 11/2011 | Chen et al. | 707/600 |
| 2004/0139116 A1* | 7/2004 | Porter | 707/104.1 |
| 2007/0038631 A1* | 2/2007 | Hiraga et al. | 707/9 |
| 2008/0120270 A1* | 5/2008 | Lamberts | 707/1 |
| 2008/0140629 A1* | 6/2008 | Porter | 707/3 |
| 2009/0287658 A1* | 11/2009 | Bennett | 707/3 |
| 2010/0217995 A1* | 8/2010 | Enoki et al. | 713/178 |
| 2010/0235334 A1* | 9/2010 | Porter | 707/694 |
| 2011/0137775 A1* | 6/2011 | Killian et al. | 705/34 |
| 2011/0238703 A1* | 9/2011 | Porter | 707/792 |

* cited by examiner

*Primary Examiner* — Thanh-Ha Dang
(74) *Attorney, Agent, or Firm* — Mintz, Levin, Cohn, Ferris, Glovsky and Popeo, P.C.

(57) ABSTRACT

A search of an insert-only database is performed using a search string in a non-key field to obtain a result set having both valid and invalid entries. Each entry includes a primary key field and the primary key field is subsequently scanned for entries in the result set to determine which entries are valid. Thereafter, invalid entries are removed from the result set to result in a modified result set. Such removal can be based, for example, on the timestamp of the respective entries. In some implementations, a secondary persistence is utilized. Related apparatus, systems, techniques and articles are also described.

20 Claims, 1 Drawing Sheet

OPTIMIZING SEARCH FOR INSERT-ONLY DATABASES AND WRITE-ONCE DATA STORAGE

TECHNICAL FIELD

The subject matter described herein relates to techniques for optimizing search in connection with insert-only databases and write-once data storage such as WORM and data storage as solid state devices, where writing a single value results in the storage media in a write operation of a large block.

BACKGROUND

Insert-only databases are databases in which updates are implemented as inserts of updated records each with a newer timestamp (as opposed to overwriting older records). When such databases are queried, the original (i.e., obsolete) records which remain in the database need to be removed from corresponding sets of results. If the query was by primary key, then all potential records are identified and can be sorted by their timestamps; the record with the most recent timestamp is valid, while all other records are invalid. But if the query was by a non-key field, not all records per primary key may be identified and an incomplete sort may therefore deliver an incorrect result.

As an example, reference is made to Table 1 below.

TABLE 1

| Record | Name | City | Timestamp |
|---|---|---|---|
| 1 | Schmidt | München | 42 |
| 2 | Mueller | Berlin | 44 |
| 3 | Mueller | München | 47 |
| 4 | Mueller | Dresden | 48 |

At time 47, the entry "Name"="Mueller" is updated that the field "City" contains the value "München", at time 48, the entry is updated again and the field "City" does now contain the value "Dresden".

If the select in the query is by "City=München", not by the primary key "Name=Mueller", then records 1 and 3 are returned. But while record 1 is still valid, record 3 was in the interim invalidated by record 4. However, this situation remains undetected because record 4 is not within the selection criteria of "City=München".

Similar problems exist for WORM memory (write once read many) like for example CD-Rs/DVD-Rs. With such arrangements, an insert only approach can only be applied because the underlying technology does not allow updates to invalidate overwritten data.

SUMMARY

In one aspect, a search of an insert-only database is performed using a search string in a non-key field to obtain a result set having both valid and invalid entries (in which each entry has a primary key field). Subsequently, the primary key field for each entry in the result set is scanned to identify which entries are valid. Based on this determination, invalid entries are removed from the result set to result in a modified result set.

The modified result set can be promoted in a variety of manners. For example, the modified result set can be stored, transmitted to a remote server (e.g., a client system, etc.), visually displayed, and the like. In addition or in the alternative, most recent entries can be scanned first such that, when a match is identified, older entries as defined by the timestamps are removed from the result set. Such an arrangement can be beneficial in that it can reduce scan time because the first match found by scanning is the current entry.

In a further aspect, a search of an insert-only database is performed using a search string to obtain a result set having both valid and invalid entries. Each entry in the insert-only database has an associated timestamp. Modification of at least one field in an entry in the insert-only database results in a corresponding entry being saved in a secondary data storage that comprises information characterizing the entry in the insert-only database including the timestamp for the entry. Thereafter, entries in the secondary data storage corresponding to the entries in the result set are scanned to determine which entries have values in a primary key field matching the search string are valid based on their timestamps. Once this determination is made, invalid entries are removed from the result set to result in a modified result set. Similar arrangements can also be implemented in connection with a write-once primary data storage instead of an insert-only database.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current subject matter optimizes write/update/delete operations for in-memory persistency, where an update of a row requires additional complex handling to provide transactional consistency and snapshot isolation during reading. The current subject matter also optimizes write operations for block oriented storage by enabling update and delete operations for "insert-only" storage.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
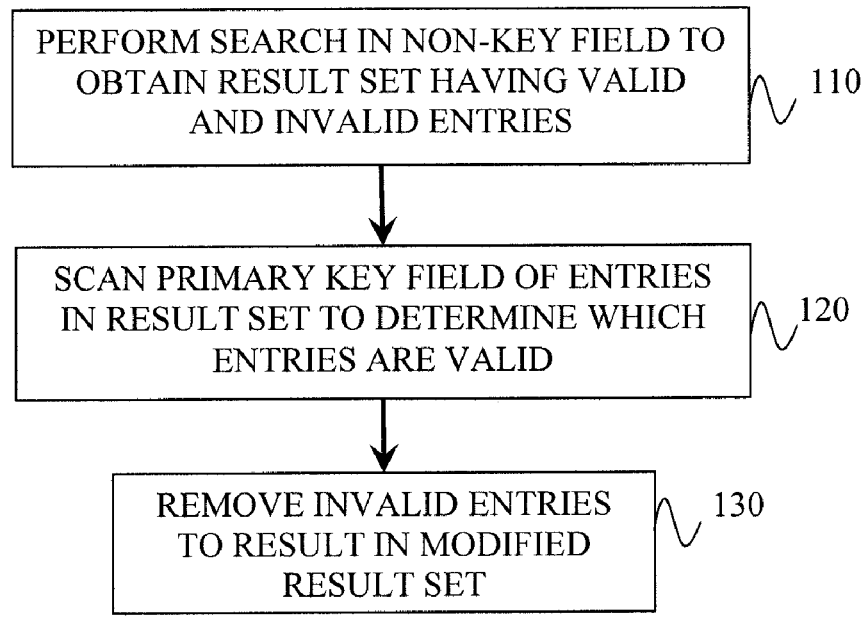
FIG. 1 is a process flow diagram illustrating a first method of searching an insert-only database.

FIG. 1 is a process flow diagram illustrating a method 100, in which, at 110, a search of an insert-only database is performed using a search string in a non-key field to obtain a result set having both valid and invalid entries (with each entry having a primary key field). As used herein, the term "string" can be any alphanumeric input for any field type. Thereafter, at 120, the primary key field for each entry in the result set is scanned to determine which entries are valid. Based on this determination, at 130, invalid entries from the result set are removed to result in a modified result set.

Figure 2:
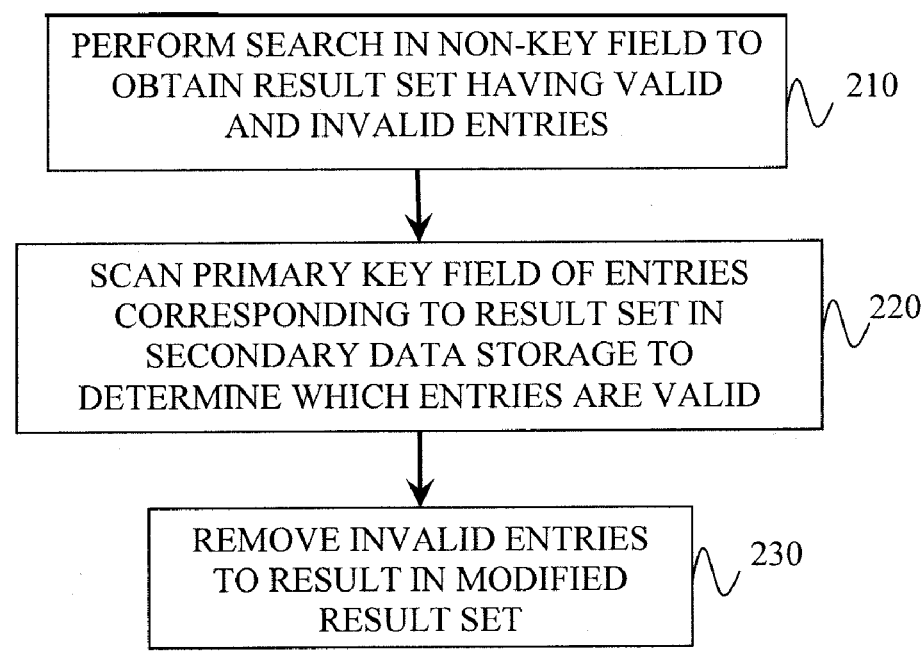
FIG. 2 is a process flow diagram illustrating a second method of searching an insert-only database.

FIG. 2 is a process flow diagram illustrating a method 200, in which, at 210, a search of an insert-only database is performed using a search string to obtain a result set having both valid and invalid entries. Each entry in the insert-only database has an associated timestamp. In addition, modification of at least one field in an entry in the insert-only database results in a corresponding entry being saved in a secondary data storage that in turn comprises information characterizing the entry in the insert-only database including the timestamp for the entry (in the insert-only database). Subsequently, at 220, primary key fields of entries in the secondary data storage are scanned to determine which entries in the result set are valid based on the timestamp. Thereafter, at 230, invalid entries from the result set are removed to result in a modified result set.

The following describes various implementations which may be implemented singly or in combination depending on the desired configuration.

In an insert-only database, indexes are not used. Rather, with such databases, new, changed and/or deleted entries are added as another entry/record with a timestamp to the table. Therefore, a table can evolve such that it contains several rows including rows that are no longer valid. Upon a search (a select, query) on a single non-key field (not a completely qualifying key—i.e., a primary key, etc.), a corresponding result set can contain entries which are no longer accurate. In some implementations as will be described below, a secondary data storage can be used to store data characterizing deleted/modified rows (which can speed up access, etc.).

For insert-only data storage (including insert-only databases as well as other types of storage), responsive entries in a results set which are no longer accurate have to be identified. This can be done as follows: Scan for the keys of the rows in the result-set in the database to identify, if for these keys an updated set is contained. If this is the case, the row has to be removed from the result-set, as it is no longer accurate. Such an approach can be optimized, if another table is maintained that contains the deleted rows/entries. A scan in this secondary table can be faster, especially for tables having few updates or deletes.

The following are examples for a search on a single non-key field. In a first example, a data field is updated and a search is conducted using a non-key field.

A table has a key "name" and a data field "city".
The table contains a row name="Maier", city="München".
The entry for name="Maier" is updated and a new row is inserted in the table, with the value of the key and new value of the data field (i.e., first it had been "München" and now it is "Berlin").
Now the row is "Maier", "Berlin".
A query for <city="München"> will scan column city and identify all entries with value "München".
This result set will contain also the data set <"Maier", "München">, even if this entry had been inserted with the updated data field "Berlin" later.

To now identify, which data sets are still valid, the table is scanned again with the according to the keys of each row in the result set.

The entry "Maier" is searched from the latest to the earlier entries, the first row matching key "Maier" is accurate, the other entries in the result-set are relicts (no longer valid rows) and are removed from the result set.
If several entries are in the result-set, the entries can be searched in parallel.

The length of the second search is dependent on when the first entry was generated. In addition, for data sets which are not updated frequently, but are updated or deleted only once after the insertion of a subsequent entry, the second scan can take a considerable amount of time. As an example: a table containing a "queue", where an entry is inserted (to launch a processing) and deleted (once the processing is complete). This kind of table can result in very slow access, if a query searches for a non-key field.

The following illustrates updating a key field followed by a subsequent search for a key field.

A table has a key "name" and a data field "city".
The table contains a row in which name="Maier", city="München"
If the entry for name="Maier" is updated to name="Mueller", a new row is inserted with values "Mueller", "München" for the fields "name" and "city".
In the table, the new row is inserted, and for the old key "Maier", a "delete" is inserted.
A query for 'name="Maier"' will scan column name and identify all entries with value "Maier".
The entry with "Maier" and delete is found (if scanned in reverse sequential order (i.e., latest to earliest entries)).
No further action is required.

The current subject matter also applies to solid state storage devices and other types of write once media. Such storage devices include, for example, single-write ROM (e.g. CD-R and DVD-R, etc.). In addition, with these storage devices, it is not possible to update a written data set and so a new dataset can be added (to another CD/DVD or to a newly added block).

With write once storage devices, "read" operations can be performed rapidly and for "write" operations, a "block" is written. This arrangement can result in an update of a single flag in a row of a table results in an update of a complete block. In an insert-only database, the ability of the insert-only mode is to some extent weakened, if in addition to an inserted updated line, also the old lines need to be updated. Therefore, an update will result in two blocks to be written.

The current approach takes full advantage of insert-only arrangements, as only one block is written (the one for the inserted updated line). A procedure which does not update rows, but works completely "insert-only" bypasses these problems and enable update and delete also for insert-only storages.

In cases in which an entry has been deleted or updated, a secondary data storage can be used in addition to the "insert data" storage (which can be referred to as the deleted records storage). In one scenario, there can be a very large data store in which some records are updated after a longer period of time. In the example described above, where a search looks for a non-key field, the second search can take a considerable period of time and so a secondary data storage can be advantageous in reducing the time of a second search.

In one example, all entries in a database can be enriched by a time-stamp while a secondary storage (deletes-table) can be used to keep the "deletes". Below is an example.

An entry (name, city)=("Maier", "Berlin") shall be updated to ("Maier", "Frankfurt")
The row "Maier", "Berlin" has the timestamp 1234
The row "Maier", "Frankfurt" is added to the table with a new timestamp 1245
The row "Maier", "Berlin" is added to the deletes-table, including the time-stamp of the "old" entry 1234
Example: search for citizens of "Berlin":
The row "Maier", "Berlin" is found.
Now the database looks in the deletes-table for key "Maier".
If an entry is found, and the timestamp is the same, the entry has been deleted, and the database identifies, that this entry is no longer valid.

If an entry is found, but the timestamps differ, the entry is still valid (and the deletion is related to another data set).

Using this approach, the following scenario can also be handled.

A data set is inserted, afterwards deleted, and inserted again.

Each event has an own timestamp.

Insert (Maier, München)->timestamp 1

Delete (Maier, München)->added with timestamp 2 to the original table. In the delete-table it is inserted with the timestamp 1

Insert (Maier, München)->timestamp 3.

A search for "München" results in 2 result sets (with timestamp 1 and 3)

A scan in deletes-table finds the entry with timestamp 1, which can then be removed from the result set.

This approach can be optimized: if a table receives frequent updates and deletes, the delete store is getting large. Once it is above a certain threshold, the access using the initial table scan is faster than using both tables, in this case, the delete-table can be skipped. In addition, if a table, includes a large number of entries and only a small percentage of the entries are ever update or deleted, the delete-store (i.e., secondary storage, etc.) can improve performance.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Moreover, in some implementations, a database can be utilized in which rows can either be marked as non-valid in the original row (and entries that are marked as non-valid can be eliminated from the corresponding results set). In addition, for access through via keys (each of which have an associated increasing timestamp), a timestamp compare can identify the valid entries. Another approach to use in connection with the current subject matter is to utilize an index that only contains valid entries. Other embodiments may be within the scope of the following claims.

What is claimed is:

1. A method comprising:
   performing, by at least one processor, a search of an insert-only database using a search string to obtain a result set having both valid and invalid entries, each entry in the insert-only database having an associated timestamp, the valid entries having a most recent timestamp and the invalid entries each having an earlier timestamp than a subsequent corresponding valid entry, wherein modification of at least one field in an entry in the insert-only database results in a corresponding entry being saved in a secondary data storage that comprises information characterizing the entry in the insert-only database including the timestamp for the entry;
   scanning, by at least one processor, primary key fields of entries in the secondary data storage corresponding to the entries in the result set to determine which entries are valid based on their timestamps; and
   removing, by at least one processor, invalid entries from the result set to result in a modified result set.

2. The method of claim 1, wherein the search uses a search string in a non-key field.

3. The method of claim 1, further comprising: promoting, by at least one processor, the modified result set.

4. The method of claim 1, wherein promoting the modified result set comprises storing the modified result set.

5. The method of claim 1, wherein promoting the modified result set comprises transmitting the modified result set to a remote server.

6. The method of claim 1, wherein promoting the modified result set comprises visually displaying at least a portion of the modified result set.

7. The method of claim 1, wherein most recent entries as defined by the timestamps are scanned first such that, when a match is identified, older entries are removed from the result set.

8. A method for implementation by one or more data processors comprising:

performing, by at least one processor, a search of a write-once primary data storage using a search string to obtain a result set having both valid and invalid entries, each entry in the primary data storage having an associated timestamp, the valid entries having a most recent timestamp and the invalid entries each having an earlier timestamp than a subsequent corresponding valid entry, wherein modification of at least one field in an entry in the primary data storage results in a corresponding entry being saved in a secondary data storage that comprises information characterizing the entry in the primary data storage including the timestamp for the entry;

scanning, by at least one processor, primary key fields of entries in the secondary data storage corresponding to the entries in the result set to determine which entries are valid based on their timestamps; and removing, by at least one processor, invalid entries from the result set to result in a modified result set.

9. The method of claim 8, wherein the search uses a search string in a non-key field.

10. The method of claim 8, further comprising: promoting, by at least one processor, the modified result set.

11. The method of claim 8, wherein promoting the modified result set comprises storing the modified result set.

12. The method of claim 8, wherein promoting the modified result set comprises transmitting the modified result set to a remote server.

13. The method of claim 8, wherein promoting the modified result set comprises visually displaying at least a portion of the modified result set.

14. The method of claim 8, wherein most recent entries are scanned first such that, when a match is identified, older entries are removed from the result set.

15. A non-transitory computer program product storing instructions, which when executed by one or more data processors, result in operations comprising:

performing, by at least one processor, a search of an insert-only database using a search string to obtain a result set having both valid and invalid entries, each entry in the insert-only database having an associated timestamp, the valid entries having a most recent timestamp and the invalid entries each having an earlier timestamp than a subsequent corresponding valid entry, wherein modification of at least one field in an entry in the insert-only database results in a corresponding entry being saved in a secondary data storage that comprises information characterizing the entry in the insert-only database including the timestamp for the entry;

scanning, by at least one processor, primary key fields of entries in the secondary data storage corresponding to the entries in the result set to determine which entries are valid based on their timestamps; and removing, by at least one processor, invalid entries from the result set to result in a modified result set.

16. The non-transitory computer program product of claim 15, wherein the search uses a search string in a non-key field.

17. The non-transitory computer program product of claim 15, further comprising: promoting, by at least one processor, the modified result set.

18. The non-transitory computer program product of claim 15, wherein promoting the modified result set comprises storing the modified result set and/or transmitting the modified result set to a remote server.

19. The non-transitory computer program product of claim 15, wherein promoting the modified result set comprises visually displaying at least a portion of the modified result set.

20. The non-transitory computer program product of claim 15, wherein most recent entries as defined by the timestamps are scanned first such that, when a match is identified, older entries are removed from the result set.

* * * * *